United States Patent
Ugolini

(10) Patent No.: US 9,561,711 B2
(45) Date of Patent: Feb. 7, 2017

(54) CONVERTIBLE CAR WITH A RIGID SUNROOF AND A FRONT ENGINE AND CORRESPONDING CONTROL METHOD

(71) Applicant: Ferrari S.p.A., Modena (IT)

(72) Inventor: Riccardo Ugolini, San Lazzaro di Savena (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 14/661,428

(22) Filed: Mar. 18, 2015

(65) Prior Publication Data

US 2015/0266362 A1    Sep. 24, 2015

(30) Foreign Application Priority Data

Mar. 19, 2014  (IT) .............................. BO2014A0142

(51) Int. Cl.
  *B60J 7/20*   (2006.01)
  *B60J 7/14*   (2006.01)

(52) U.S. Cl.
  CPC . *B60J 7/205* (2013.01); *B60J 7/14* (2013.01); *B60J 7/202* (2013.01)

(58) Field of Classification Search
  CPC .............. B60J 7/08; B60J 7/12; B60J 7/1204; B60J 7/14; B60J 7/143; B60J 7/16; B60J 7/1628; B60J 7/202; B60J 7/205
  USPC ...................................... 296/76, 107.08, 108
  See application file for complete search history.

(56) References Cited

U.S. PATENT DOCUMENTS

| | | | | |
|---|---|---|---|---|
| 7,032,952 B2 * | 4/2006 | Dilluvio | ................... | B60J 7/205 296/107.08 |
| 7,819,459 B2 * | 10/2010 | Kinnanen | ................ | B60J 7/205 296/107.08 |
| 8,042,857 B2 * | 10/2011 | Noda | ....................... | B60J 7/205 296/107.08 |

(Continued)

FOREIGN PATENT DOCUMENTS

| | | | | |
|---|---|---|---|---|
| DE | 102007012673 | * | 9/2008 | .............. B60J 7/205 |
| DE | 10 2007 044 021 A1 | | 4/2009 | |

(Continued)

OTHER PUBLICATIONS

English translation of DE 10 2007 012 673 A1; retrieved from Espacenet via PatentTranslate on Dec. 9, 2015.*

(Continued)

*Primary Examiner* — Jason S Daniels
(74) *Attorney, Agent, or Firm* — Blank Rome LLP

(57) ABSTRACT

A convertible car with a front engine having: a passenger compartment; a rigid sunroof; a trunk, which contains the rigid sunroof when the rigid sunroof is arranged in an open position; an upper covering, which is arranged over the trunk and is mobile between a closed position and an open position; a trunk lid, which is supported by the upper covering and is mobile relative to the upper covering; a first actuating device, suited to move the upper covering between the closed position and the open position; a second actuating device, suited to move the trunk lid relative to the upper covering between a completely closed position, in which the trunk lid completely closes the access to the trunk, and a semi-open position, in which the trunk lid is arranged in an intermediate position between the completely closed position and a completely open position.

10 Claims, 11 Drawing Sheets

(56) References Cited

U.S. PATENT DOCUMENTS

2013/0038084 A1* 2/2013 Kinnanen ............... B60J 7/146
296/107.17

FOREIGN PATENT DOCUMENTS

| DE | 10 2008 029 549 A1 | 12/2009 |
|----|---------------------|---------|
| DE | 10 2008 056 375 A1 | 5/2010  |
| EP | 2 082 912 A2       | 7/2009  |

OTHER PUBLICATIONS

English translation of DE 10 2008 056 375; retreived Jun. 6, 2016 via PatentTranslate located at www.epo.org.*

* cited by examiner

CONVERTIBLE CAR WITH A RIGID SUNROOF AND A FRONT ENGINE AND CORRESPONDING CONTROL METHOD

TECHNICAL FIELD

The present invention relates to a convertible car with a rigid sunroof and a front engine and corresponding control method.

PRIOR ART

Italian patent application BO2013A000137 describes a convertible car with a rigid sunroof having a passenger compartment with four seats (two front seats and two rear seats), an engine compartment arranged in front position (i.e. in front of the passenger compartment) and closed by a hood, and a trunk arranged in rear position (i.e. behind the passenger compartment) and closed by a trunk lid. The rigid sunroof comprises a pair of rigid elements, which are mechanically connected to a frame by means of respective connection members, and thus are arranged inside the trunk (in particular in the upper zone of the trunk) when the rigid sunroof is arranged in an open position. The trunk is closed by an upper covering, which supports the trunk lid (hinged to the upper covering itself) and is hinged to the frame to move between a closed position, in which the upper covering completely closes the trunk, and an open position, in which the upper covering is relatively distant from the trunk to allow access to the trunk itself and thus to allow to move the two elements of the rigid sunroof into the trunk (when the car is open) or out from the trunk (when the car is closed).

In most convertible cars currently available on the market of the type described above, the loading threshold of the trunk is very high and at the same time the trunk lid is reduced in size, so that the opening which can be used to access the trunk is very small, making the trunk poorly exploitable (particularly when the elements of the rigid sunroof are stowed in the trunk). Some solutions have been suggested to increase the size of the opening which can be used to access the trunk (in particular by attempting to lower the load threshold of the trunk); however, the solutions suggested until today cause considerable complications to the connection mechanisms between the upper covering and the frame, with a consequent increase of weight, increase of manufacturing costs, increase of internal dimensions (which however, despite not reducing the opening which can be used to access the trunk, reduce the total volume of the trunk) and a greater setting complication (which potentially may cause a decrease of reliability over time).

Patent application DE102008056375A1 describes a convertible car with front engine comprising: a rigid sunroof; a trunk, which is arranged in a rear position and contains the rigid sunroof, when the rigid sunroof is arranged in an open position; an upper covering, which is arranged over the trunk and is mobile between a closed position, in which the upper covering covers the trunk on the top, and an open position, in which the upper covering is separated from the trunk so as to allow the rigid sunroof to move into/out from the trunk; and a trunk lid which is hinged to the upper covering so as to access the trunk from behind.

DESCRIPTION OF THE INVENTION

It is the object of the present invention to provide a convertible car with a rigid sunroof and a front engine and corresponding control method, which convertible car and control method are free from the drawbacks described above and at the same time are easy and cost-effective to make.

According to the present invention, a convertible car with a rigid sunroof and a front engine and corresponding control method are provided as disclosed in the appended claims.

BRIEF DESCRIPTION OF THE DRAWINGS

The present invention will now be described with reference to the accompanying drawings, which show a non-limitative embodiment thereof, in which.

PREFERRED EMBODIMENTS OF THE INVENTION

Figure 1:
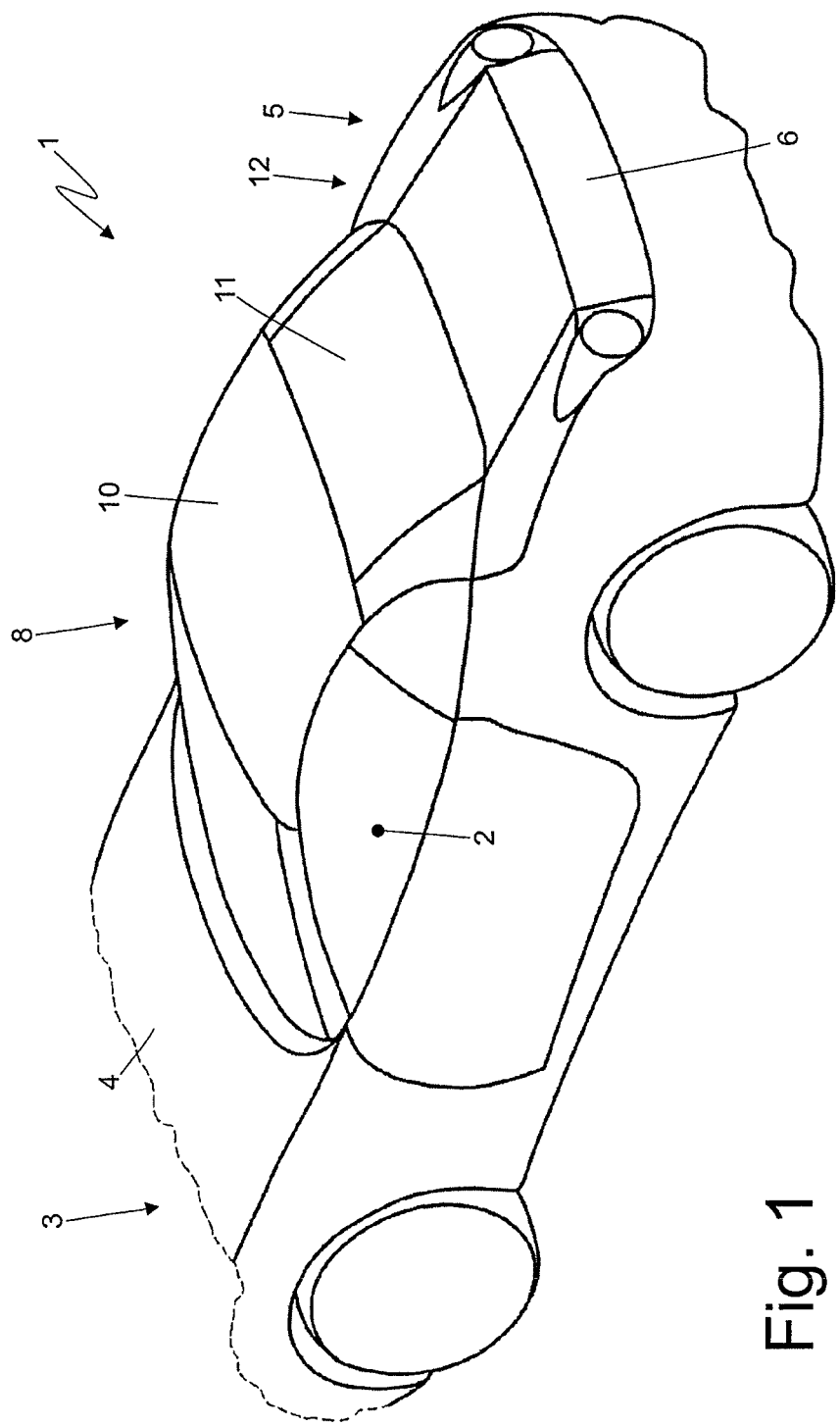
FIG. 1 is a perspective, diagrammatic view of a convertible car with a rigid sunroof and front engine, which car is made according to the present invention and has the roof in a closed position.
Figure 5:
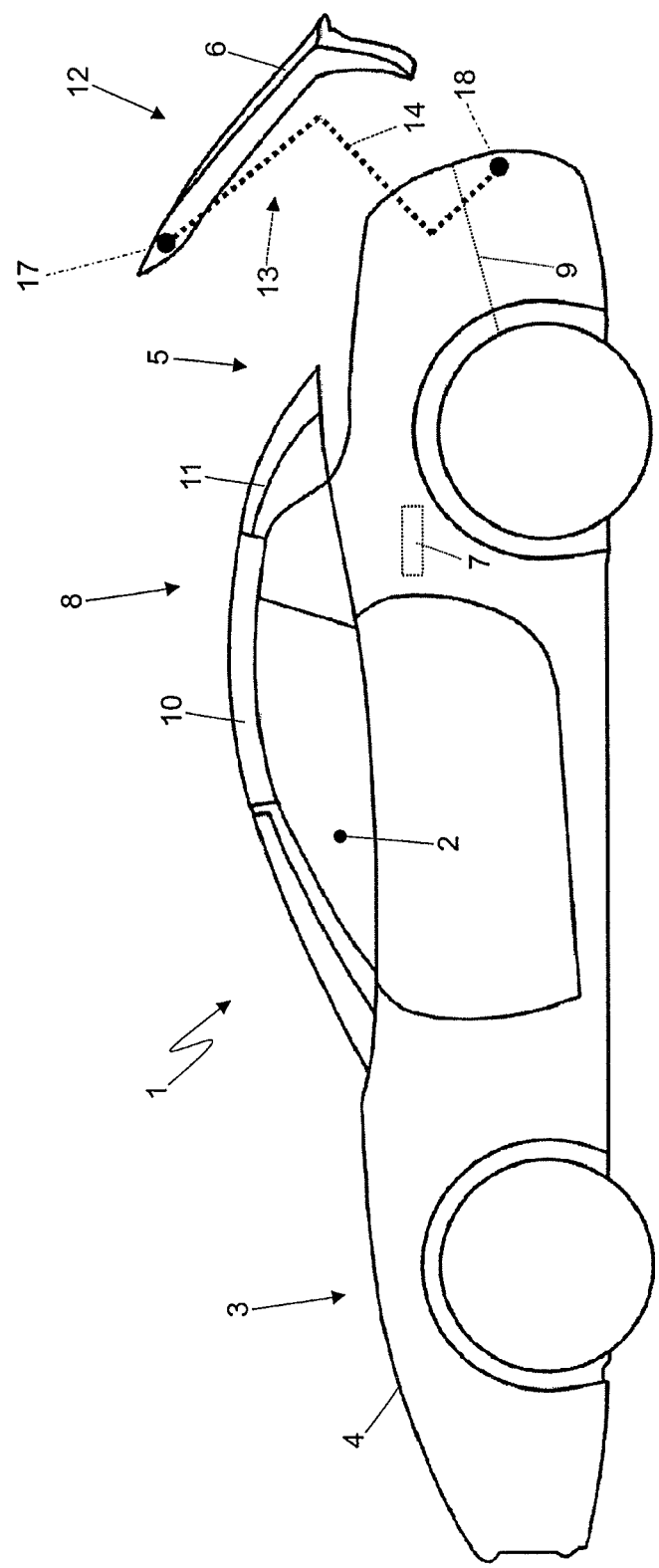
Figure 6:
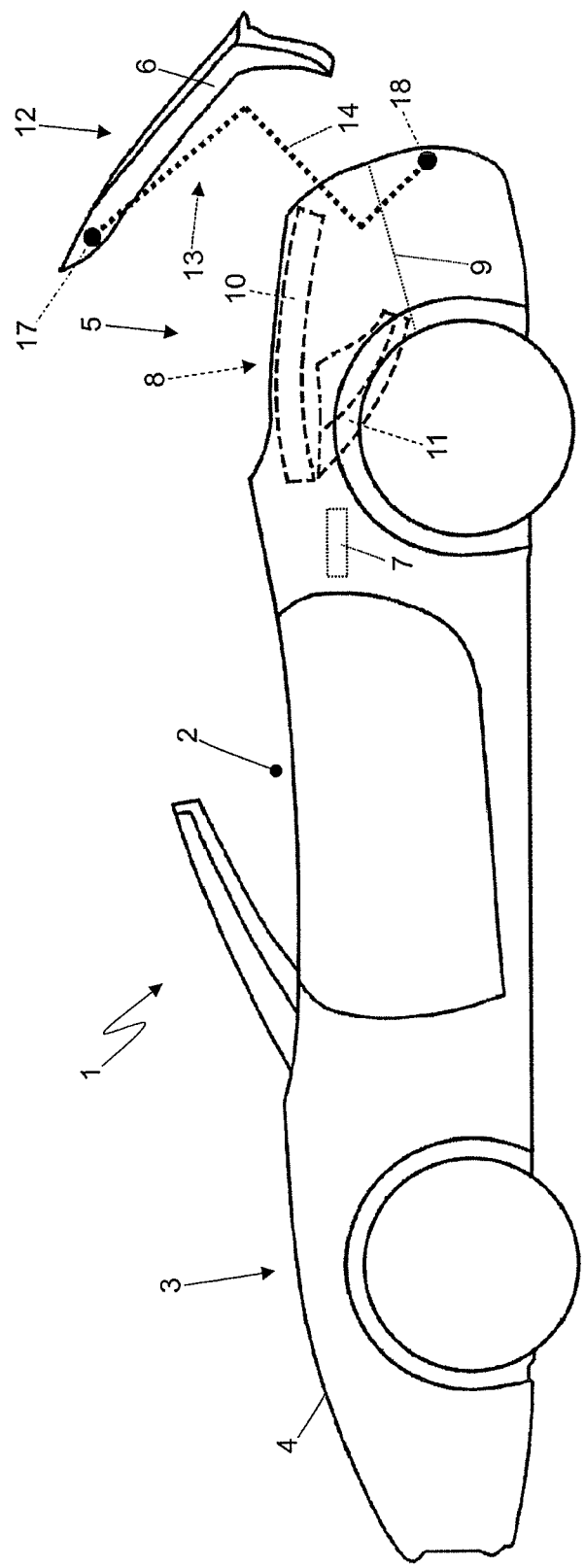

In FIG. 1, reference numeral 1 indicates as a whole a car having a passenger compartment 2 with two or four seats, an engine compartment 3 arranged in front position (i.e. in front of the passenger compartment 2) and closed by a hood 4, and trunk 5 arranged in rear position (i.e. behind the passenger compartment 2) and closed by a trunk lid 6. A frame 7 (a part of which is diagrammatically shown in FIGS. 3-9 and 10) of the car 1 supports a rigid sunroof 8, which may be arranged in an open position (illustrated in FIGS. 2 and 6-8) in which the passenger compartment 2 is open (and the rigid sunroof 8 is arranged inside the trunk 5) or in a closed position (illustrated in FIGS. 1, 3-5 and 9) in which the passenger compartment 2 is closed by the rigid sunroof 8. When the rigid sunroof 8 is arranged in the open position (illustrated in FIGS. 2 and 6-8), the rigid sunroof 8 is arranged inside the trunk (in particular in the upper zone of the trunk 5, as illustrated in FIG. 6); preferably, a mobile separation element 9 is provided which divides the trunk 5 so as to establish a physical separation between the upper zone intended to house the rigid sunroof 8 and the lower zone available for the luggage.

Figure 2:
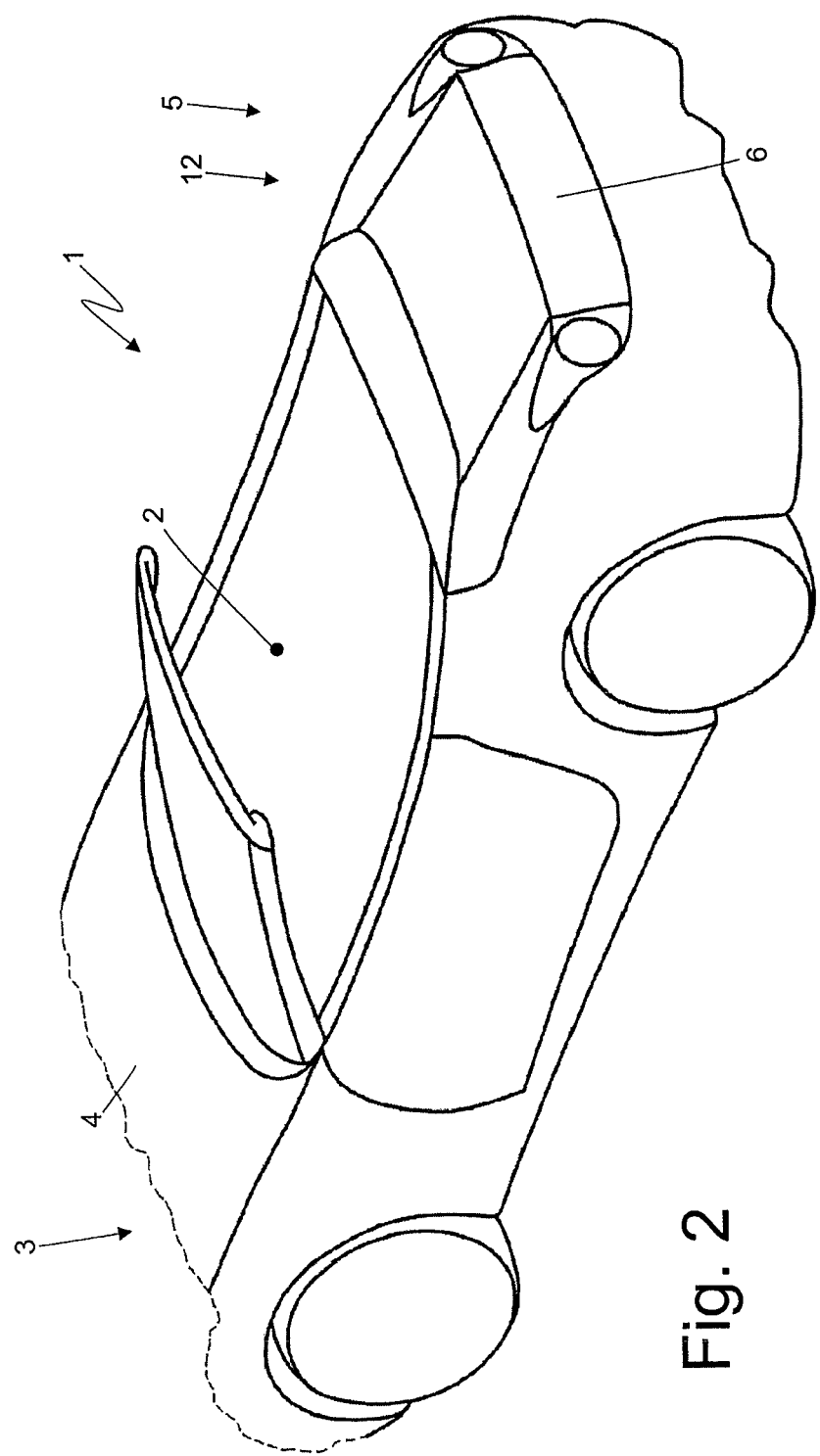
FIG. 2 is a perspective, diagrammatic view of the car in FIG. 1 with the roof open.

As illustrated in FIGS. 1 and 2, the rigid sunroof 8 comprises a pair of rigid elements 10 and 11 (i.e. the rigid sunroof 8 comprises two, and only two, elements 10 and 11). The elements 10 and 11 are substantially flat, i.e. the elements 10 and 11 have a flat development (free from parts or appendixes which protrude beyond the plane) and have small longitudinal and transversal bulges which are absolutely necessary to have an appropriate connection with the other parts of the body. The elements 10 and 11 are carried by the frame 7 by means of respective supporting members (not shown), which are arranged on opposite sides of the elements 10 and 11 themselves.

When the rigid sunroof 8 is set in the closed position (illustrated in FIGS. 1, 3-5 and 8), the two elements 10 and 11 are arranged substantially horizontal and substantially coplanar to each other so as to be arranged seamlessly after each other. When the rigid sunroof 8 is arranged in the open position (illustrated in FIGS. 2 and 6-8), the two elements 10 and 11 are arranged inside the trunk 5 (in particular in the upper zone of the trunk 5) and are arranged substantially horizontal over one another (as illustrated in FIG. 6).

The trunk 5 is closed by an upper covering 12, which is connected (in particular hinged) to the frame 7 to move between a closed position (illustrated in FIGS. 1-4 and 7-9), in which the upper covering 12 closes (i.e. completely closes) the trunk 5 from the top, and an open position (illustrated in FIGS. 5-6), in which the upper covering 12 is separated (i.e. relatively distanced) from the trunk 5 to allow access to the trunk 5 from the top and thus allow the rigid sunroof 8 to move into/out from the trunk 5. The upper covering 12 supports the trunk lid 6 which is hinged to the upper covering 12 itself (as shown in greater detail below); in other words, the trunk lid 6 is integral with the upper covering 12 and moves together with the upper covering 12 when the upper covering 12 itself is moved between the closed position (illustrated in FIGS. 1-4 and 7-9) and the open position (illustrated in FIGS. 5-6). FIG. 9 shows an example of the opening movement of the trunk lid 6, which turns with respect to the upper covering 12, which remains stationary.

According to a preferred, but not limiting, embodiment (illustrated in FIGS. 3-10), a support body 13 is provided, which supports the upper covering 12, is U-shaped and comprises two lateral arms 14 (only one of which is shown in FIGS. 3-10) arranged longitudinally and a central element 15 (illustrated in FIG. 10), which is arranged at the rear and transversely, and connects the two lateral arms 14 to each other.

Figure 9:
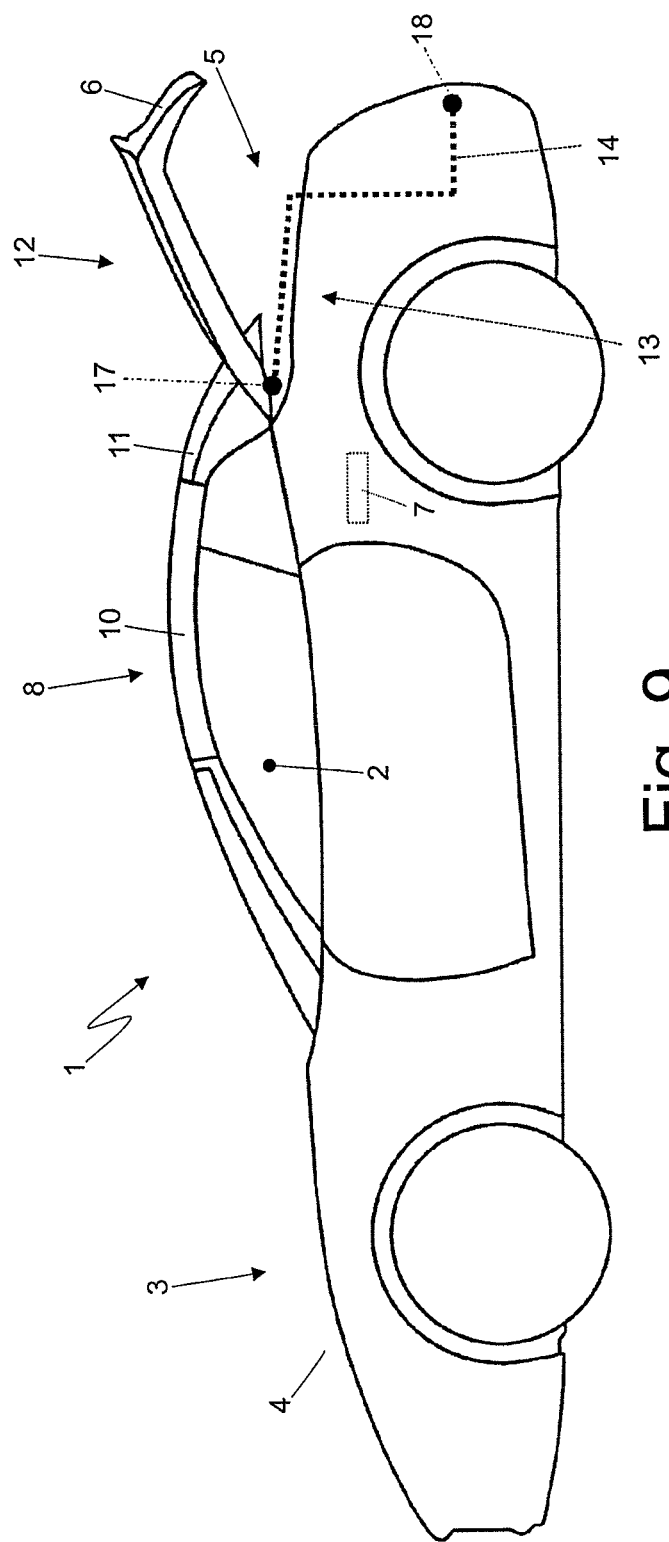
FIG. 9 is a lateral, diagrammatic view of the car in FIG. 1 with the roof in a closed position and with a trunk lid open.
Figure 10:
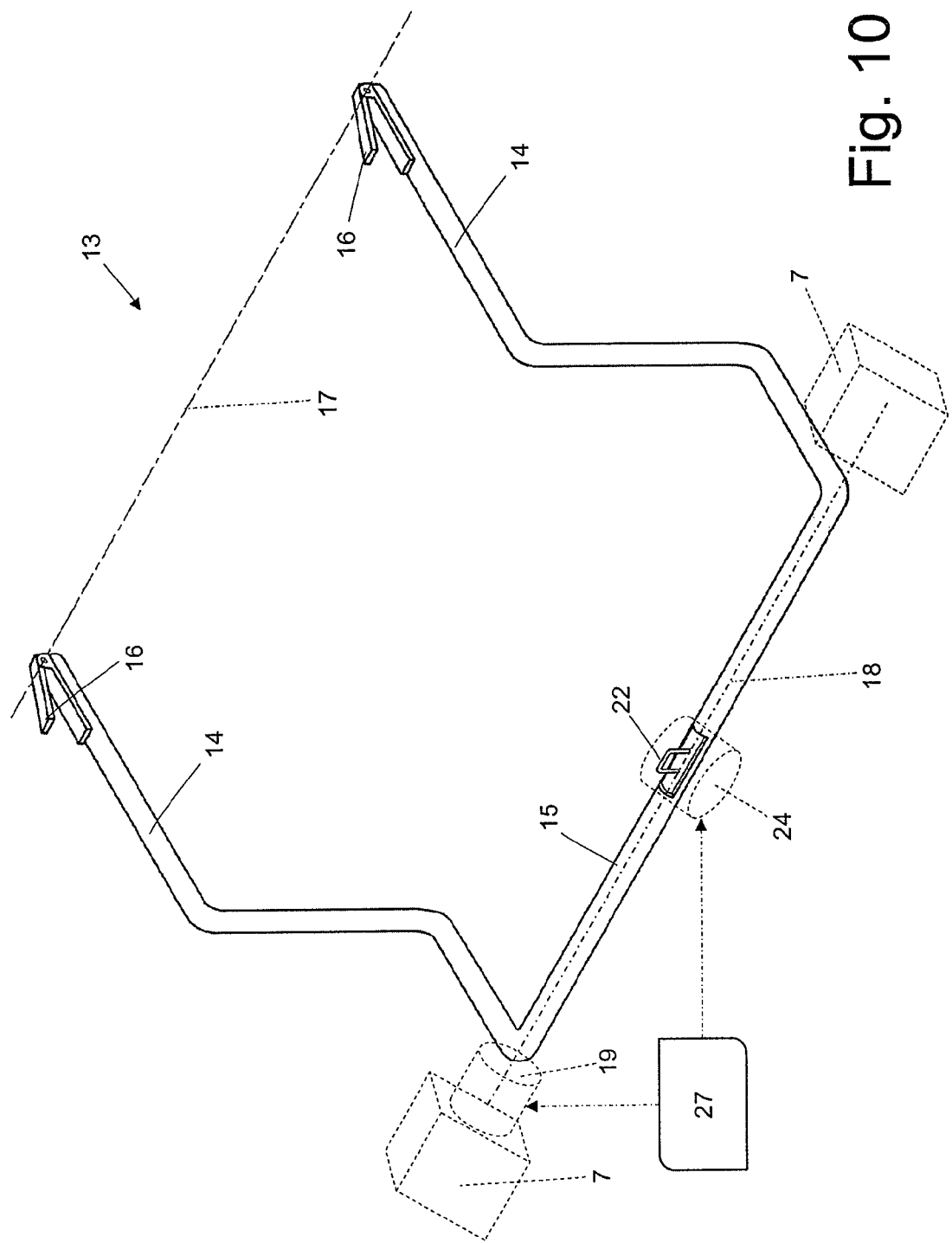
FIG. 10 is a diagrammatic, perspective view of a support body of an upper covering of a trunk of the car in FIG. 1.

As shown in FIG. 10, each lateral arm 14 of the support body 13 is Z-shaped and at its front end (i.e. on the opposite end of the central element 15) carries a hinge 16 of the trunk lid 6 to make the trunk lid 6 turn about a rotation axis 17 arranged transversely (i.e. the trunk lid 6 carries out a pure rotation movement with respect to the support body 13 of the upper covering 12). Obviously, each lateral arm 14 of the support body 13 could also be other than Z-shaped (e.g. it could be L-shaped). According to an alternative, perfectly equivalent embodiment (not shown), the two hinges 16 are replaced by corresponding articulated quadrilaterals to make the trunk lid 6 carry out a rototranslation movement with respect to the support body 13 of the upper covering 12. In other words, the trunk lid 6 is supported by the upper covering 12 (in particular by the support body 13 of the upper covering 12) and is mobile with respect to the upper covering 12 to be open so as to access the trunk 5 from behind (as illustrated in FIG. 9, in which the trunk lid 6 is completely open to allow rear access to the trunk 5, e.g. to put in or take out luggage from the trunk 5 itself).

The central element 15 of the support body 13 is arranged behind and hinged about the frame 7 to turn the upper covering 12 about a rotation axis 18 arranged transversally (i.e. the upper covering 12 performs a pure rotation movement with respect to the frame 7). According to an alternative, perfectly equivalent embodiment (not shown), the hinges of the central element 15 are replaced by corresponding articulated quadrilaterals to make the upper covering 12 carry out a rototranslation movement with respect to the frame 7.

As illustrated in FIG. 10, an actuating device 19 (e.g. electric or hydraulic) is provided, which is mechanically connected to the upper covering 12 (in particular to the support body 13 of the upper covering 12) and is suited to move the upper covering 12 between the closed position (illustrated in FIGS. 1-4 and 7-9) and the open position (illustrated in FIGS. 5-6) by making the upper covering 12 turn about the rotation axis 18.

Figure 12:
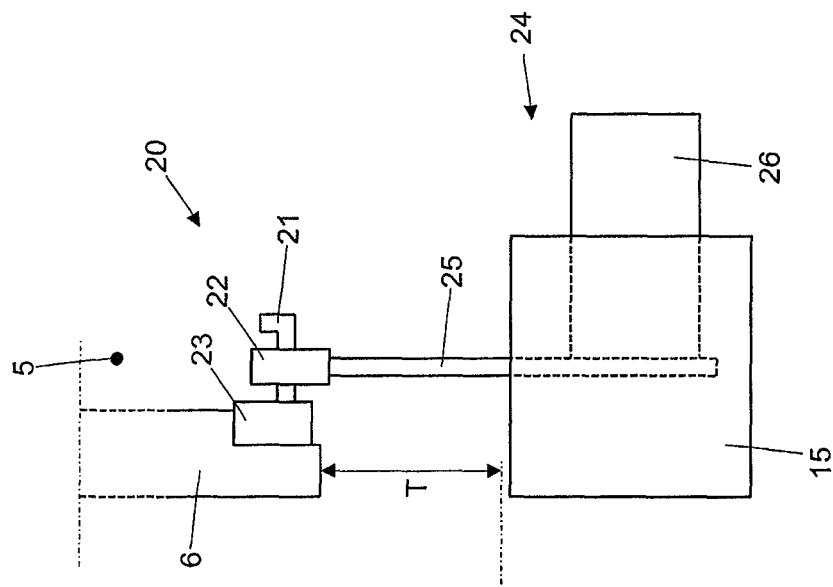
FIGS. 11 and 12 are two diagrammatic, lateral views of an actuating device which moves a trunk lid of the car between a completely closed position and a semi-open position.
Figure 11:
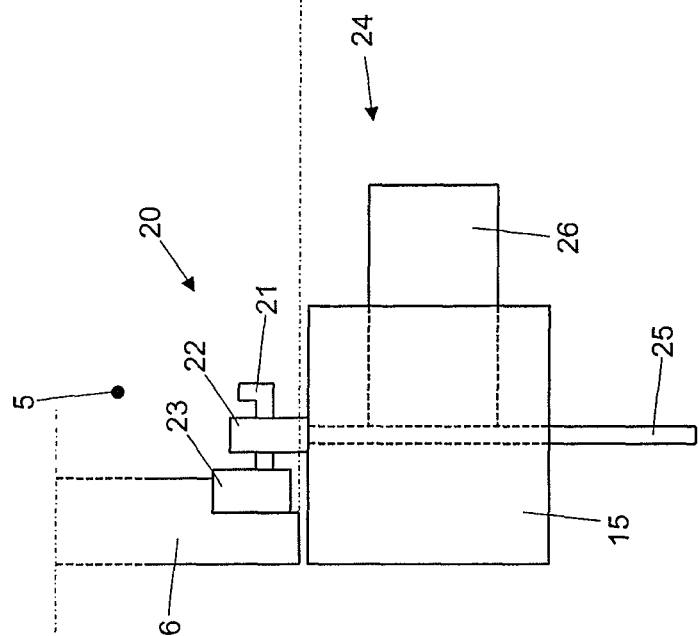

As illustrated in FIGS. 11 and 12, the trunk lid 6 is provided with a lock 20 for keeping the trunk lid 6 in the closed position creating a mechanical constraint between a lower wall of the trunk lid 6 and an upper wall of the central element 15 of the support body 13. The lock 20 comprises a locking element 21 integral with the trunk lid 6 and a locking element 22 which is suited to couple with the locking element 21 and is integral with the upper covering 12 (in particular with the central element 15 of the support body 13 of the upper covering 12). According to a preferred embodiment, the locking element 21 of the lock 20 comprises a mobile hook (diagrammatically illustrated in FIGS. 11 and 12), and the locking element 22 of the lock 20 comprises a fixed ring (diagrammatically illustrated in FIGS. 11 and 12 and illustrated more in detail in FIG. 10) which is adapted to be engaged by the hook. The lock 20 comprises a servo assisted snapping mechanism 23 which supports the locking element 21 (i.e. the hook) and is adapted to cause an opening movement of the locking element 21 to disengage the locking element 21 itself from the locking element 22 when the trunk lid 6 must be opened.

As shown in FIGS. 10, 11 and 12, an actuating device 24 is provided which is mechanically connected to the trunk lid 6 and is adapted to move the trunk lid 6 with respect to the upper covering 12 between a completely closed position (illustrated in FIGS. 3, 8 and 11), in which the trunk lid 6 completely closes access to the trunk 5, and a semi-open position (illustrated in FIGS. 4-7 and 12), in which the trunk lid 6 is arranged in an intermediate position between the completely closed position (illustrated in FIGS. 3, 8 and 11) and a completely open position (illustrated in FIG. 9). In other words, the trunk lid 6 is only slightly distanced from the upper covering 12 in the semi-open position. According to a preferred, but not limiting, embodiment, a lower edge of the trunk lid 6 covers a travel T (shown in FIG. 12) comprised between 8 and 15 centimeters to move from the completely closed position to the semi-open position.

According to a preferred, but not limiting, embodiment, the actuating device 24 is mechanically connected to one of the locking elements 21 or 22 of the lock to cause a movement of the locking elements 21 or 22 of the lock 20. In particular, the locking element 22 of the lock 20 is supported by the central element 15 of the support body 13 of the upper covering 12 (as clearly illustrated in FIGS. 10, 11 and 12) and the actuating device 24 causes a movement of the locking element 22 with respect to the upper covering 12 (more specifically with respect to the central element 15 of the support body 13 of the upper covering 12).

According to a possible (but not limiting) embodiment illustrated in FIGS. 11 and 12, the locking element 22 of the lock 20 is integral with a rod 25 which is mounted in sliding manner in the central element 15 of the support body 13 of the upper covering 12; a motor 26 (e.g. electric or hydraulic) is provided, which is mechanically coupled with the rod 25 to control the translation of the rod 25 itself with respect to the central element 15 of the support body 13 between a retracted position (illustrated in FIG. 11 and corresponding to the completely closed position of the trunk lid 6) and an extracted position (illustrated in FIG. 12 and corresponding to the semi-open position of the trunk lid 6). It is worth noting that the movement kinetics of the rod 25 must be designed to allow the trunk lid 6 to turn about the rotation axis 17 during the movement between the completely closed and the semi-open position.

Finally, an electronic control unit 27 (diagrammatically illustrated in FIG. 10) is provided, which, among other things, controls the movement of the rigid sunroof 8 and controls both the actuating device 19 for moving the upper covering 12 between the closed position and the open position, and the actuating device 24 for preventively moving the trunk lid 6 from the completely closed position to the semi-open position during the movement of the rigid sunroof 8.

The method followed by the control unit 27 to open the car 1, i.e. to move the rigid sunroof 8 from the closed position (illustrated in FIGS. 3-5) to the open position (illustrated in FIGS. 6-8) is described below with reference to FIGS. 3-8.

Figure 3:
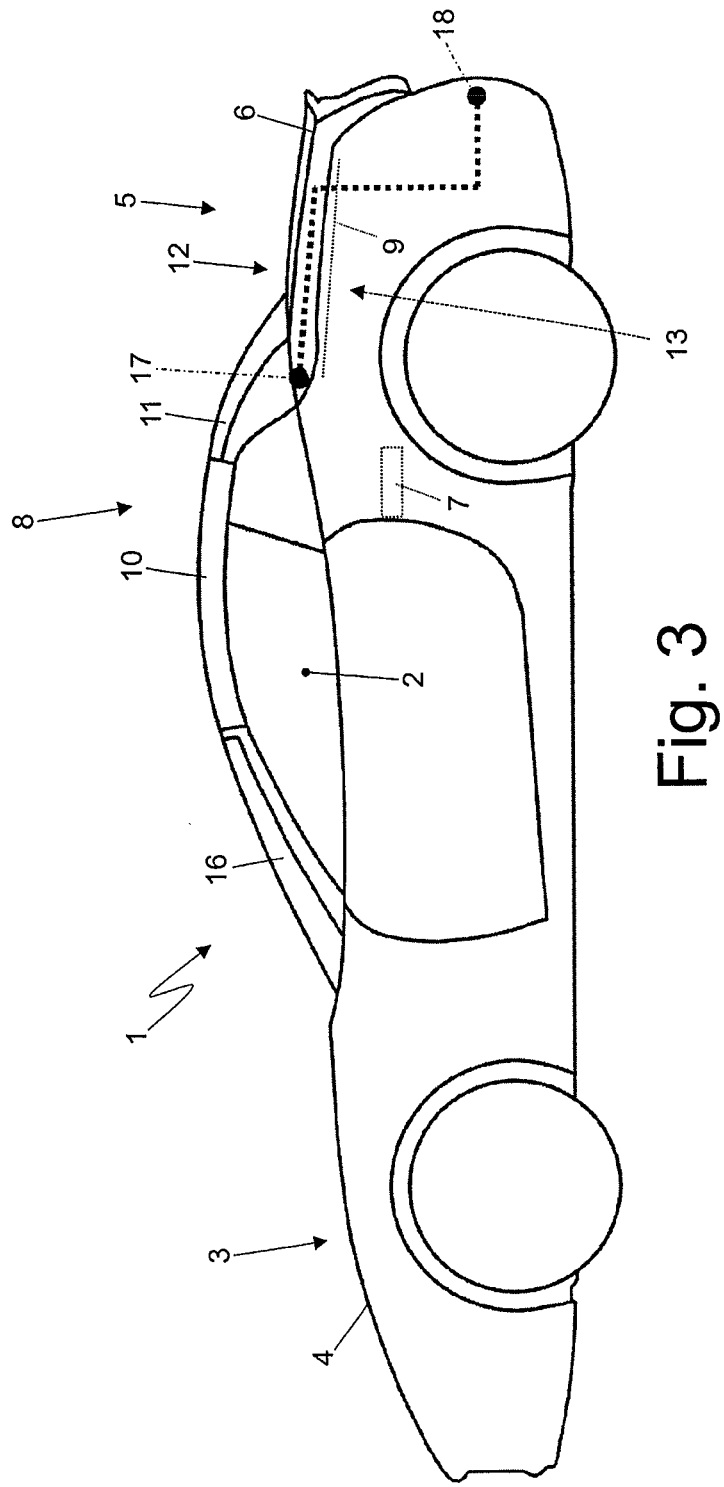
FIGS. 3-8 are a series of lateral, diagrammatic views of the car in FIG. 1 during the subsequent steps of opening of the roof.

Firstly, the rigid roof 8 is arranged in the closed position, the trunk lid 6 is in the completely closed position and the upper covering 12 of the trunk 5 is in the closed position (situation illustrated in FIG. 3).

Figure 4:
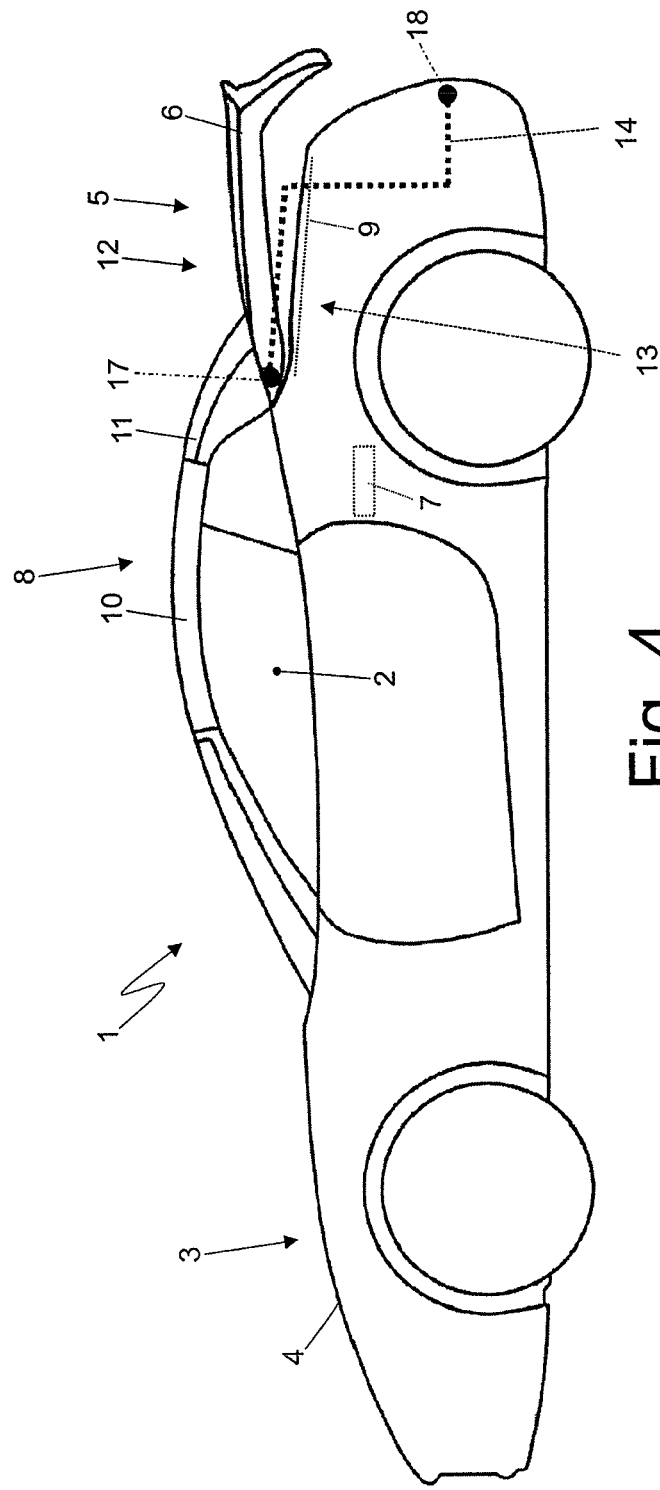

The first operation which is carried out by the control unit 27 is to move the trunk lid 6 by means of the actuating device 24 from the completely closed position (illustrated in FIG. 3) to the semi-open position keeping the upper covering 12 of the trunk 5 in the closed position (situation illustrated in FIG. 4).

Subsequently (i.e. after having preventively moved the trunk lid 6 to the semi-open position), the control unit 27 uses the actuating device 19 to move the upper covering 12 of the trunk 5 from the closed position (illustrated in FIG. 4) to the open position keeping the trunk lid 6 in the semi-open position (situation illustrated in FIG. 5). In this manner, the rigid sunroof 8 may be let into the trunk 5.

At this point, the control unit 27 moves the two elements 10 and 11 of the rigid sunroof 8 from the closed position (illustrated in FIG. 5) to the open position (illustrated in FIG. 6), in which the two elements 10 and 11 of the rigid sunroof 8 are stowed inside the trunk 5.

Figure 7:
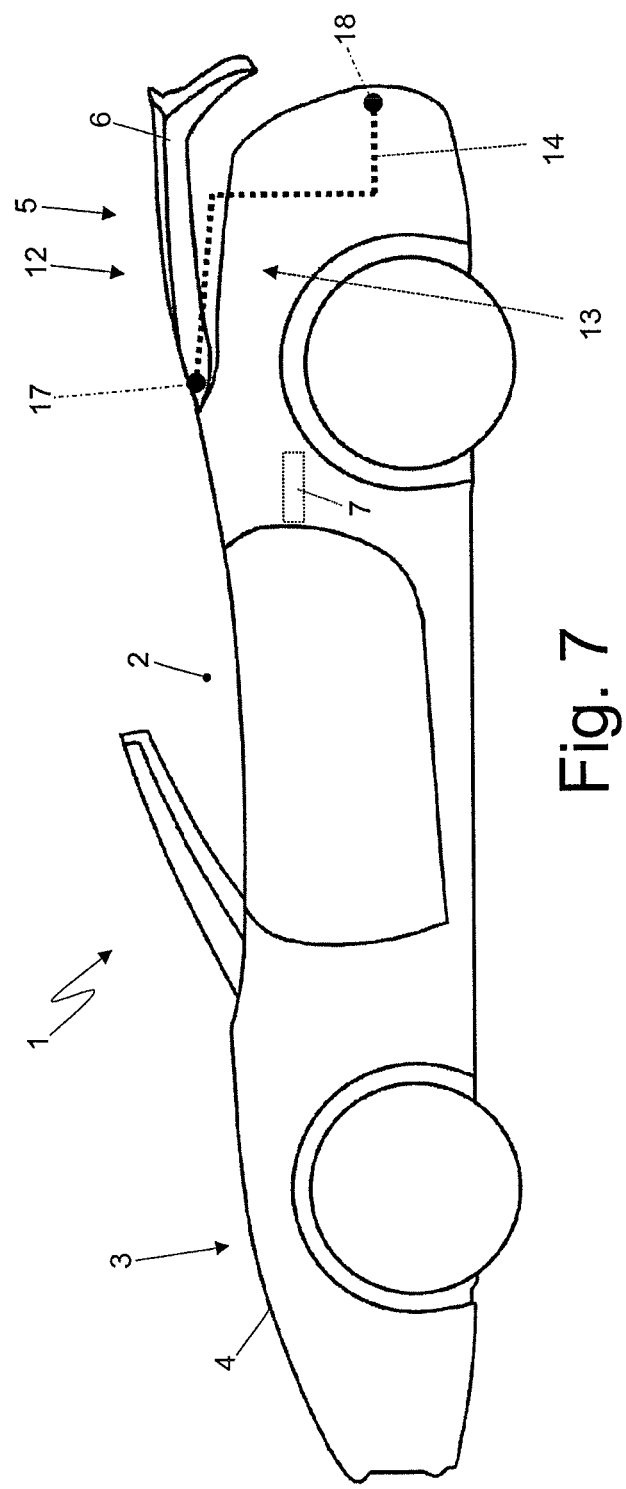

Once the elements 10 and 11 of the rigid sunroof 8 are stowed in the trunk 5 (as illustrated in FIG. 6), the control unit 27 moves the upper covering 12 of the trunk 5 using the actuating device 19 from the open position (illustrated in FIG. 6) to the closed position (illustrated in FIG. 7) keeping the trunk lid 6 in the semi-open position (situation illustrated in FIG. 7).

Figure 8:
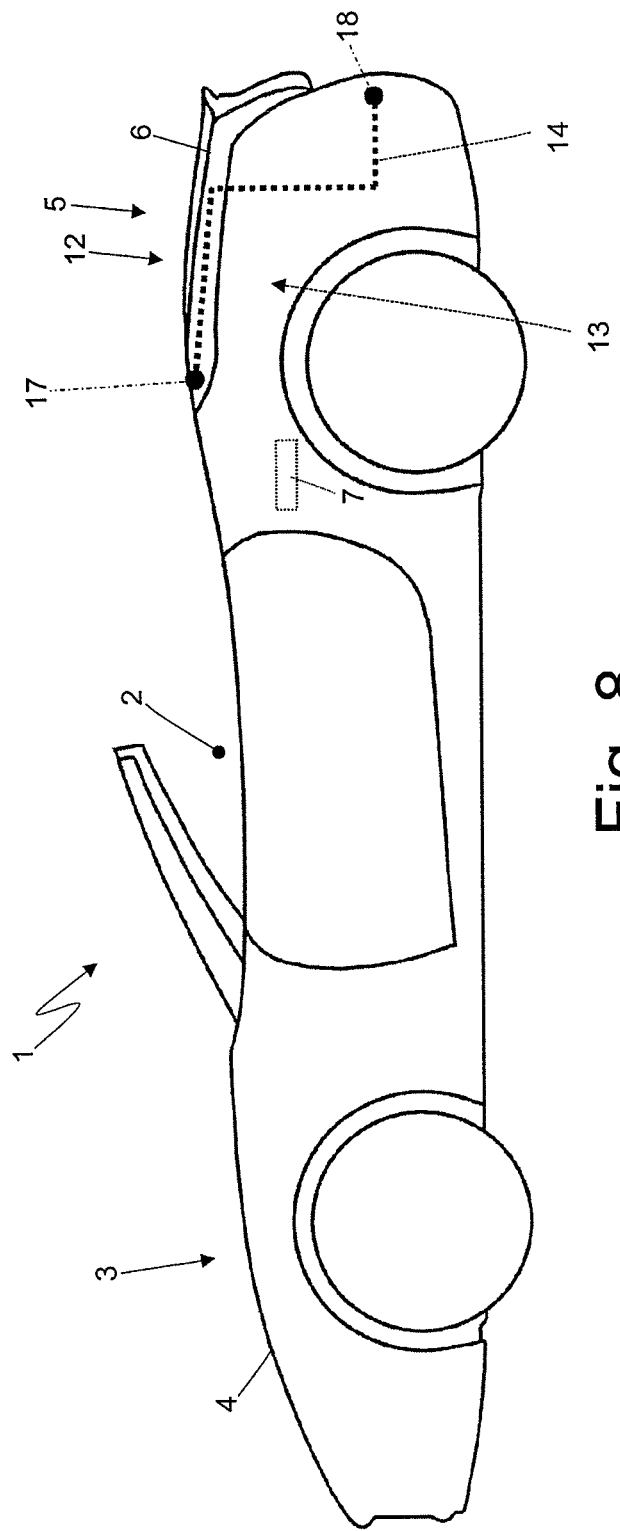

Finally, once the upper covering 12 of the trunk 5 has been returned to the closed position (illustrated in FIG. 7), the control unit 27 ends the operations by moving the trunk lid 6 by means of the actuating device 24 from the semi-open position to the completely closed position (situation illustrated in FIG. 8).

The method followed by the electronic control unit 27 to close the car 1, i.e. to move the rigid sunroof 8 from the open position (illustrated in FIGS. 6-8) to the closed position (illustrated in FIGS. 3-5) is, mutatis mutandis, entirely similarly to the method described above to open the car 1, and thus no further explanations are required.

To summarize the above, before controlling the actuating device 19 to move the upper covering 12 of the trunk 5 from the closed position to the open position, the control unit 27 controls the actuating device 24 to preventively move the trunk lid 6 from the completely closed position to the semi-open position; similarly, the control unit 27, after having controlled the actuating device 19 to move the upper covering 12 of the trunk 5 from the open position to the closed position, controls the actuating device 24 to move the trunk lid 6 from the semi-open position to the completely closed position. Furthermore, the control unit 27 always keeps the trunk lid 6 in the semi-open position when the upper covering 12 of the trunk lid 5 is in a position other than the closed position (i.e. when the upper covering 12 stops in the open position or is moving in an intermediate position between the closed position and the open position).

The car 1 described above has many advantages.

The preventive movement of the trunk lid 6 with respect to the rear covering 12 of the trunk 5 and before moving the rear covering 12 itself allows the rear covering 12 to overcome, during its movement, the fixed dimensions (in particular the rear fender) also using a pure rotation (i.e. a very simple kinematics) and in presence of a very low threshold of the trunk 5. Two considerable benefits can be obtained in this manner: the substantial lowering of the load threshold of the trunk 5 to the advantage of usability of the trunk 5, and at the same time a great simplification of the kinematics moving the rear covering 12. Indeed, the pure rotation of the rear covering 12 allows to simplify the kinematics which moves the rear covering 12 to the greatest extent to the advantage of reduction of cost and interior dimensions, and to increase reliability over time (i.e. possible manufacturing faults and mechanical wear are minimized by virtue of the intrinsically simple structure of the kinematics).

The invention claimed is:

1. A convertible car with a front engine comprising:
    a frame;
    a passenger compartment;
    a rigid sunroof, which can be set to an open position or a closed position relative to the passenger compartment;
    a trunk, which is arranged in a rear position and contains the rigid sunroof, when the rigid sunroof is arranged in the open position;
    an upper covering, which is arranged over the trunk and is mobile between a closed position, in which the upper covering covers the trunk on the top, and an open position, in which the upper covering is separated from the trunk so as to allow the rigid sunroof to move into/out from the trunk;
    a trunk lid, which is supported by the upper covering and is mobile relative to the upper covering so as to be opened to allow to access the trunk from the behind;
    a first actuating device, which is mechanically connected to the upper covering and is suited to move the upper covering between the closed position and the open position;
    a second actuating device, which is mechanically connected to the trunk lid and is suited to move the trunk lid relative to the upper covering between a completely closed position, in which the trunk lid completely closes the access to the trunk, and a semi-open position, in which the trunk lid is arranged in an intermediate position between the completely closed position and a completely open position; and
    a control unit, which controls the movement of the rigid sunroof and controls the first actuating device to move the upper covering between the closed position and the open position during the movements of the rigid sunroof; and
    wherein the control unit, before controlling the first actuating device to move the upper covering from the closed position to the open position, preventively controls the second actuating device to move the trunk lid from the completely closed position to the semi-open position;

wherein the control unit, after having controlled the first actuating device to move the upper covering from the open position to the closed position, controls the second actuating device to move the trunk lid from the semi-open position to the completely closed position;

wherein the trunk lid is provided with a lock which comprises a first locking element, integral with the trunk lid, and a second locking element, which is suited to couple with the first locking element and is integral with the upper covering, wherein the lock comprises a servo assisted snapping mechanism which supports the first locking element and is adapted to cause an opening movement of the first locking element to disengage the first locking element itself from the second locking element when the trunk lid must be opened; and wherein the second actuating device is mechanically connected to one of the locking elements of the lock so as to cause one of the locking elements of the lock to move, together with the other locking element while the first locking element is coupled with the second locking element and without de-coupling the first locking element from the second locking element, for moving the trunk lid relative to the upper covering between the completely closed position and the semi-open position.

2. The convertible car according to claim 1, wherein the second actuating device causes the first locking element of the lock to move relative to the trunk lid.

3. The convertible car according to claim 1, wherein the second actuating device causes the second locking element of the lock to move relative to the upper covering.

4. The convertible car according to claim 1, wherein the first locking element of the lock comprises a mobile hook, and the second locking element of the lock comprises a fixed ring, which is suited to be engaged by the hook.

5. The convertible car according to claim 1, wherein the control unit always keeps the trunk lid in the semi-open position, when the upper covering of the trunk is in a position other than the closed position.

6. The convertible car according to claim 1, wherein:
the first locking element of the lock comprises a mobile hook; and
the second locking element of the lock comprises a fixed ring adapted to be engaged by the hook.

7. The convertible car according to claim 1, further comprising a support body, which supports the upper covering and is hinged to the frame of the car about a rotation axis arranged transversely so as the upper covering performs a pure rotation relative to the frame and around the rotation axis between the closed position and the open position, wherein:
the second locking element of the lock is supported by a central element of the support body of the upper covering; and
the second actuating device causes a movement of the second locking element with respect to the central element of the support body.

8. The convertible car according to claim 7, wherein:
the second locking element of the lock is integral with a rod which is mounted in sliding manner in the central element of the support body; and
the second actuating device comprises a motor which is mechanically coupled with the rod to control the translation of the rod itself with respect to the central element of the support body between a retracted position corresponding to the completely closed position of the trunk lid and an extracted position corresponding to the semi-open position of the trunk lid.

9. A method to control a convertible car with a front engine comprising: a passenger compartment;
a frame;
a rigid sunroof, which can be set to an open position or a closed position relative to the passenger compartment;
a trunk, which is arranged in a rear position and contains the rigid sunroof, when the rigid sunroof is arranged in the open position;
an upper covering, which is arranged over the trunk and is mobile between a closed position, in which the upper covering covers the trunk on the top, and an open position, in which the upper covering is separated from the trunk so as to allow the rigid sunroof to move into/out from the trunk;
a trunk lid, which is supported by the upper covering and is mobile relative to the upper covering so as to be opened to allow to access the trunk from the behind;
a first actuating device, which is mechanically connected to the upper covering and is suited to move the upper covering between the closed position and the open position; and
a second actuating device, which is mechanically connected to the trunk lid and is suited to move the trunk lid relative to the upper covering between a completely closed position, in which the trunk lid completely closes the access to the trunk, and a semi-open position, in which the trunk lid is arranged in an intermediate position between the completely closed position and a completely open position;
the control method comprises the steps of:
moving the upper covering between the closed position and the open position by means of the first actuating device and during the movements of the rigid sunroof;
previously moving the trunk lid from a completely closed position to the semi-open position by means of the second actuating device and before controlling the first actuating device to move the upper covering rom the closed position to the open position; and
moving the trunk lid from the semi-open position to the completely closed position by means of the second actuating device and after having controlled the first actuating device to move the upper covering from the open position to the closed position;
wherein the trunk lid is provided with a lock which comprises a first locking element, integral with the trunk lid, and a second locking element, which is suited to couple with the first locking element and is integral with the upper covering, wherein the lock comprises a servo assisted snapping mechanism which supports the first locking element and is adapted to cause an opening movement of the first locking element to disengage the first locking element itself from the second locking element when the trunk lid must be opened; and
wherein the second actuating device is mechanically connected to one of the locking elements of the lock so as to cause one of the locking elements of the lock to move, together with the other locking element while the first locking element is coupled with the second locking element and without de-coupling the first locking element from the second locking element, for moving the trunk lid relative to the upper covering between the completely closed position and the semi-open position.

10. A convertible car with a front engine comprising;
a frame;
a passenger compartment;
a rigid sunroof, which can be set to an open position or a closed position relative to the passenger compartment;
a trunk, which is arranged in a rear position and contains the rigid sunroof, when the rigid sunroof is arranged in the open position;
an upper covering, which is arranged over the trunk and is mobile between a closed position, in which the upper covering covers the trunk on the top, and an open position, in which the upper covering is separated from the trunk so as to allow the rigid sunroof to move into/out from the trunk;
a support body, which supports the upper covering and is hinged to the frame of the car about a rotation axis arranged transversely so as the upper covering performs a pure rotation relative to the frame and around the rotation axis between the closed position and the open position;
a trunk lid, which is supported by the upper covering and is mobile relative to the upper covering so as to be opened to allow to access the trunk from the behind;
a first actuating device, which is mechanically connected to the upper covering and is suited to move the upper covering between the closed position and the open position;
a second actuating device, which is mechanically connected to the trunk lid and is suited to move the trunk lid relative to the upper covering between a completely closed position, in which the trunk lid completely closes the access to the trunk, and a semi-open position, in which the trunk lid is arranged in an intermediate position between the completely closed position and a completely open position; and
a control unit, which controls the movement of the rigid sunroof and controls the first actuating device to move the upper covering between the closed position and the open position during the movements of the rigid sunroof; and
wherein the control unit, before controlling the first actuating device to move the upper covering from the closed position to the open position, preventively controls the second actuating device to move the trunk lid from the completely closed position to the semi-open position;
wherein the control unit, after having controlled the first actuating device to move the upper covering from the open position to the closed position, controls the second actuating device to move the trunk lid from the semi-open position to the completely closed position;
wherein the trunk lid is provided with a lock which comprises a first locking element, integral with the trunk lid, and a second locking element, which is suited to couple with the first locking element and is integral with the upper covering, wherein the lock comprises a servo assisted snapping mechanism which supports the first locking element and is adapted to cause an opening movement of the first locking element to disengage the first locking element itself from the second locking element when the trunk lid must be opened; and
wherein the second actuating device is mechanically connected to one of the locking elements of the lock so as to cause one of the locking elements of the lock to move, together with the other locking element while the first locking element is coupled with the second locking element and without de-coupling the first locking element from the second locking element, for moving the trunk lid relative to the upper covering between the completely closed position and the semi-open position.

* * * * *